(12) United States Patent
Ben Ayed

(10) Patent No.: US 8,646,060 B1
(45) Date of Patent: Feb. 4, 2014

(54) METHOD FOR ADAPTIVE AUTHENTICATION USING A MOBILE DEVICE

(71) Applicant: Mourad Ben Ayed, Cupertino, CA (US)

(72) Inventor: Mourad Ben Ayed, Cupertino, CA (US)

(*) Notice: Subject to any disclaimer, the term of this patent is extended or adjusted under 35 U.S.C. 154(b) by 0 days.

(21) Appl. No.: 13/954,633

(22) Filed: Jul. 30, 2013

(51) Int. Cl.
*H04L 29/06* (2006.01)
(52) U.S. Cl.
USPC ............................................................ 726/9
(58) Field of Classification Search
None
See application file for complete search history.

(56) References Cited

U.S. PATENT DOCUMENTS

| 8,045,961 | B2 | 10/2011 | Ayed | |
|---|---|---|---|---|
| 2009/0221266 | A1* | 9/2009 | Ohta et al. | 455/411 |
| 2009/0265775 | A1* | 10/2009 | Wisely et al. | 726/9 |
| 2012/0030366 | A1* | 2/2012 | Collart et al. | 709/229 |
| 2013/0159119 | A1 | 6/2013 | Henderson et al. | |

* cited by examiner

*Primary Examiner* — David Pearson
(74) *Attorney, Agent, or Firm* — Daniel B. Scheim

(57) ABSTRACT

A method for facilitating login using adaptive authentication. The method uses different authentication methods and different data protection methods depending on the user location, availability of network, importance of the data.

20 Claims, 9 Drawing Sheets

METHOD FOR ADAPTIVE AUTHENTICATION USING A MOBILE DEVICE

PRIORITY

The present application is a Continuation-In-Part ("CIP") of pending U.S. patent application Ser. No. 13/935,490, filed Jul. 4, 2013.

FIELD OF THE INVENTION

The present invention relates to systems and methods for multi-factor authentication, and most particularly, adaptive authentication using a smart token device.

BACKGROUND

While passwords are a vital component of system security, they can be cracked or broken relatively easily. Password cracking is the process of figuring out or breaking passwords in order to gain unauthorized entrance to a system or account. It is much easier than most users would think. Passwords can be cracked in a variety of different ways. The most simple is the use of a word list or dictionary program to break the password by brute force. These programs compare lists of words or character combination against password until they find a match.

Another easy way for potential intruders to nab passwords is through social engineering: physically nabbing the password off a Post-It from under someone's keyboard or through imitating an IT engineer and asking over the phone. Many users create passwords that can be guessed by learning a minimal amount of information about the person whose password is being sought. A more technical way of learning passwords is through sniffers, which look at the raw data transmitted across the net and decipher its contents. "A sniffer can read every keystroke sent out from your machine, including passwords".

Recently, several companies were hacked, and recommended using two-step authentication or out of band SMS for authentication.

Also, more and more enterprises are introducing tablets, BYOD and cloud which are introducing new security challenges. Traditional multi-factor authentication technologies such as CAC card, RSA SecurID token . . . are difficult to use with tablets. These devices stay active when the user leaves them un-attended, and the devices are easily lost. Most importantly, a thief can wait for a person to log in before stealing the device with open session.

Recent application by the same inventor do not cover more sophisticated authentication methods, timeouts, user communication, Bluetooth and physical security.

Thus, a need exists for a smart token device that enables adaptive authentication to applications with better security features.

SUMMARY OF THE INVENTION

A method for adaptive authentication comprising: initiating a first transaction onboard a first user terminal, whereby the first application terminal obtains a first user identifier using a method selected from the group consisting of: wirelessly scan a user's device, scan a bar code, obtain an identifier from a user, obtain an identifier from memory, obtain an identifier from a database, user profiling, wherein the first application terminal posts a first authentication request to a second remote server, wherein the first authentication request corresponds to a first user identifier, wherein the first authentication request comprises a first transaction information, wherein the first application terminal can obtain policy information from a remote server, wherein the first application terminal is selected from the group consisting of: a mobile device, a computing device, a television set, a point of sale terminal, a physical access terminal; running a third authentication program onboard a third mobile device, wherein the third authentication program corresponds to the first user identifier, wherein the third authentication program can login to the second remote server, wherein the third authentication program stores at least one first digital key selected from the group consisting of: a password, a random key, a one-time-password generator, a certificate, a Private Key Infrastructure (PKI) key, a symmetric key, an asymmetric key, payment information, access information, physical access code, wherein the at least one first digital key can be stored in a secure memory location or on a secure element onboard the third mobile device, wherein the third mobile device is distinct from the first user terminal, wherein upon detecting a user action onboard the third mobile device, wherein the user action is selected from the group consisting of: a button push, a display touch, a motion, a spoken word, an application brought to the foreground, if the third authentication program obtains a pending authentication request wirelessly from the second remote server, wherein the pending authentication request corresponds to the first user identifier, the third authentication program can display the first transaction information, the third authentication program initiates a user authentication action onboard the third mobile device and uses a user authentication method selected from the group consisting of: verify a button is activated or a menu is selected or a display is touched or an application is brought to the foreground, authenticate a pass code, authenticate a response to a challenge question, authenticate biometric information, verify that both the third mobile device and a fifth mobile device authorized the first transaction, wherein the fifth mobile device is distinct from the third mobile device, wherein the user authentication method is different from a previously used user authentication method, wherein upon or after a successful user authentication, the third authentication program posts an authentication information update to the second remote server, wherein the authentication information update corresponds to the pending authentication request, wherein the authentication information update comprises the at least one first digital key or at least one second digital key corresponding to the at least one first digital key; whereby after a pre-determined period of time, if the first application terminal retrieves an authentication information update corresponding to the first authentication request, the first application terminal uses the authentication information update to perform an action selected from the group consisting of: unlock, uncloak, decrypt data, login to an application, authenticate to a remote server, authorize a transaction, transmit user information wirelessly to a separate terminal, login automatically to an application interface, call a script.

A method for adaptive authentication comprising: initiating a first transaction onboard a first user terminal,
running a third authentication program onboard a third mobile device,
wherein upon detecting a user action onboard the third mobile device,
if the third authentication program obtains a pending authentication request wirelessly from the second remote server,
wherein the pending authentication request corresponds to the first user identifier, the third authentication program can display the first transaction information,
the third authentication program initiates a user authentication action onboard the third mobile device and uses a user authentication method selected from the group consisting of: verify a button is activated or a menu is selected or a display is touched or an application is brought to the foreground, authenticate a pass code, authenticate a response to a challenge question, authenticate biometric information, verify that both the third mobile device and a fifth mobile device authorized the first transaction, wherein the fifth mobile device is distinct from the third mobile device,
wherein the user authentication method is different from a previously used user authentication method, wherein upon or after a successful user authentication,
the third authentication program posts an authentication information update to the second remote server, wherein the authentication information update corresponds to the pending authentication request, wherein the authentication information update comprises the at least one first digital key or at least one second digital key corresponding to the at least one first digital key;
whereby after a pre-determined period of time,
if the first application terminal retrieves an authentication information update corresponding to the first authentication request,
the first application terminal uses the authentication information update to perform an action selected from the group consisting of:
unlock, uncloak, decrypt data, login to an application, authenticate to a remote server, authorize a transaction, transmit user information wirelessly to a separate terminal, login automatically to an application interface, call a script.

A method for adaptive authentication comprising:
initiating a first transaction onboard a first user terminal, whereby the first application terminal can obtain a token identifier either from memory, from a remote database, or from scanning devices, whereby the first application terminal can obtain policy information from a remote server,
whereby the first application terminal sends a first authentication request wirelessly to a third mobile device, wherein the first authentication request can comprise a first transaction information,
wherein the third mobile device corresponds to the token identifier;
running a third authentication program onboard a third mobile device,
wherein the third authentication program stores at least one first digital key selected from the group consisting of:
a password, a random key, a one-time-password generator, a certificate, a Private Key Infrastructure (PKI) key, a symmetric key, an asymmetric key, payment information, access information, physical access code,
wherein the at least one first digital key can be stored in a secure memory location or on a secure element onboard the third mobile device,
wherein the third mobile device is distinct from the first user terminal;
whereby after receipt of a wireless response from the third mobile device,
wherein the wireless response comprises at least one second digital key corresponding to the at least one first digital key, the first application terminal initiates a user authentication action and uses a user authentication method selected from the group consisting of:
verify a button is activated or a menu is selected or a display is touched or an application is brought to the foreground,
authenticate a pass code,
authenticate a response to a challenge question,
authenticate biometric information,
verify that both the third mobile device and a fifth mobile device authorized the first transaction, wherein the fifth mobile device is distinct from the third mobile device,
wherein the user authentication method is different from a previously used user authentication method;
wherein upon or after a successful user authentication,
the first application terminal uses the at least one second digital key to perform an action selected from the group consisting of:
unlock, uncloak, decrypt data, login to an application, authenticate to a remote server, authorize a transaction, transmit user information wirelessly to a separate terminal, login automatically to an application interface, call a script.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

This patent teaches a method for facilitating authentication using a mobile device. This patent teaches using either an application onboard a mobile device for authentication to any application on any terminal.

The current application improves over the previous application with:

Improving access security with two-man-rule authentication feature where 2 people have to approve access.

Improving access security with adaptive timeout where the timeout changes depending on where the user is.

Improving security by displaying transaction and confirmation/receipt information as this adds better user communication and prevents some man-in-the-middle attacks.

Improving security through enabling physical security with the mobile device, and emulating access codes to physical access readers.

The current invention uses a smart phone application or a hard token to authenticate transaction on any type of terminal using adaptive authentication, and to facilitate or harden the user login based on location risk, transaction risk, user risk . . . .

The invention enables to leverage a smart phone application program or a hard token to authenticate login on any type of terminal using adaptive authentication, and to close the session if the user moves or separates from the terminal.

The invention enables to add multi-factor authentication to any application including applications that run in a browser, iOS applications, Android applications, Windows application, Windows OS, Mac OS, or any embedded application that has access to the internet . . . .

Figure 1:
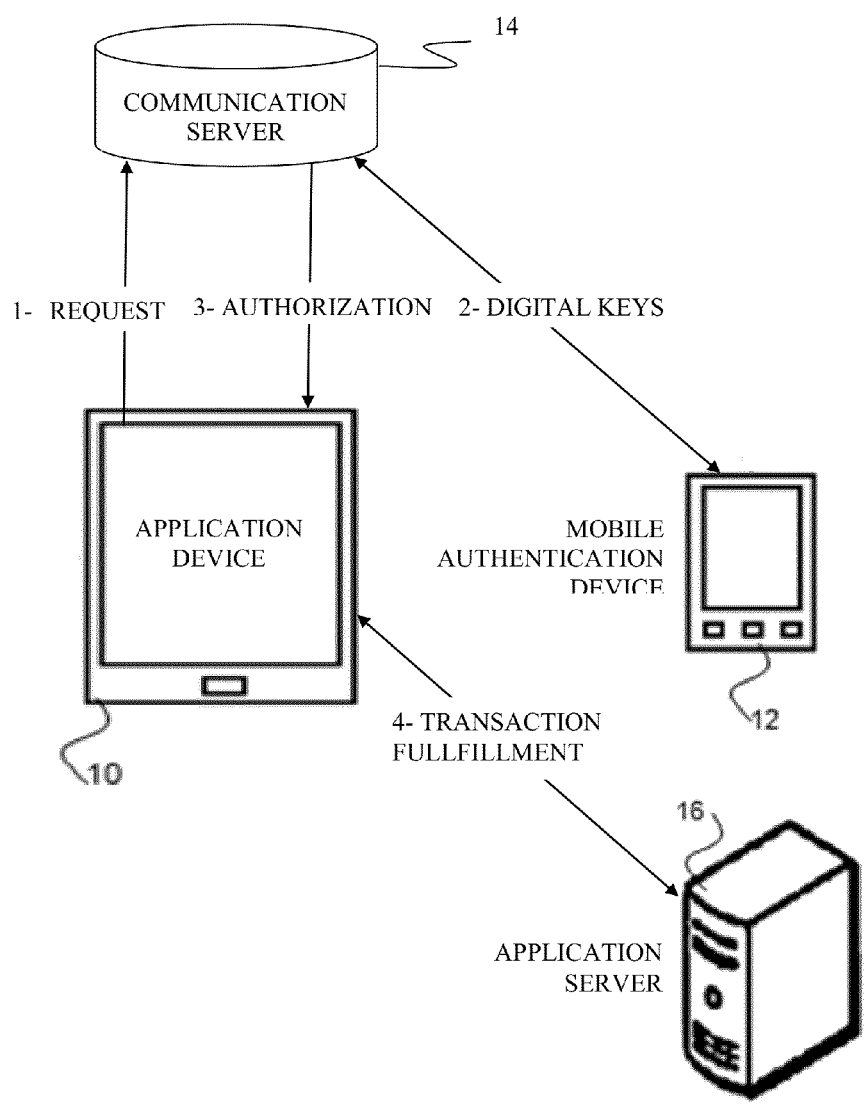
FIG. 1 is a schematic illustrating a cloud-based adaptive authentication system using a mobile device.

Referring to FIG. 1, a cloud-based adaptive authentication system using a smart phone according to a first embodiment includes a user application device 10, a mobile authentication device 12, a communication server 14 and an application server 16.

User application device 10 can be any device including a mobile device, a computing device, a television set, a point of sale terminal, a door entry reader. User application device 10 communicates with communication server 14 and with application server 16 using wireless/cellular data communication or wired communication. User application device 10 runs applications or operations that collaborate with application server 16 to provide services to the user such as data, documents, forms, workflows, CRM, payment operations, physical access, door access, etc.

User application device 10 can request login/connection to application server 16; however, it needs the user credentials. Those user credentials can only be supplied by mobile authentication device 12 and through communication server 14.

User application device 10 can hold encrypted user login information for application server 16. The encrypted user login information can only be decrypted using digitals keys obtained from mobile authentication device 12 and through communication server 14. Once decrypted, the user login information can be used to login to application server 16.

The invention involves a user initiating a transaction from a application device 10, the user providing authentication from a mobile authentication device 12 that is physically separate from application device 10, and using the target service onboard application device 10. The service can be provided from a remote server.

The user logs in to an account on communication server 12. The sign-up process requires certain information, such as information about a user account. The sign-up process may include other information such as username/password for different accounts, financial account sufficient to perform a transaction with the account. The sign up process can also require contact information for the user, e.g., mailing address and email, and possibly other personal identifying information, e.g., a photograph of the user. After creating an account, the user can select a merchant that also has an account with the cardless payment system. The user can give consent to perform a cardless payment transaction with the merchant if the user is within a predetermined distance from the merchant. After the user gives consent, the merchant can, without a presentment of the physical payment card, charge (in the case of credit cards) or debit (in the case of debit cards) the user's financial account for items the user wants to buy using a a user's payment card or account that is already on file with the cardless payment system. The user does not need to physically present a credit card to the merchant.

The user can sign up using a mobile application or using an online website, and can use the mobile authentication device 12 or another computing device as application device 10, e.g., a home computer. At some point prior to the transaction, a user authentication application program is downloaded to the user mobile authentication device 12, e.g., through an application store. Creation of the user account can be handled through the user application, or through another application, e.g., a generic web browser. The user enters a name, account password, and contact information, e.g., email address. The user can enter financial account information sufficient to conduct a financial transaction. Mobile authentication device 12 is a smart phone that has a unique identifier, that it is connected to the network or internet possibly through 3 G or Wifi, and that it is equipped with an accelerometer, a tilt detector and/or Bluetooth. When the user signs up with the mobile application, the device unique ID is registered with the user's account so as to guarantee that the account it tightly linked to mobile authentication device 12. Data sent to application device 10 can be encrypted with the device's ID in order to guarantee that only an authorized corresponding device can read data sent from mobile authentication device 12.

Communication server 14 holds user accounts and serves as a communication medium between application device 10 and mobile authentication device 12. Communication server 14 can also hold policies that dictate authentication rules. In a preferred embodiment, communication server 14 does not store any user login or authentication information beyond the time span of the transaction. Immediately after application device 10 retrieves the user information, the user login or authentication information is deletes. In this embodiment, the user login and authentication information is encrypted and stored on the user application device 10. This ensures that user login and authentication information is never kept in one place, and is distributed over the user terminals. The advantages is that 1) there is no central repository for the user access and authentication information for multiple applications 2) Each terminal holds encrypted login and authentication information 3) The authentication information cannot be decrypted without physically having mobile authentication device 12 and authenticating to the authentication application 4) Different login and authentication information for different applications are encrypted with different application digital keys stored on mobile authentication device 12.

Application server 16 authenticates users and provides services. A user must have a user account and must authenticate to that account in order to receive services. A service can be transactional in nature such as a payment, loyalty, door entry that is authorized against a user's payment, loyalty, physical access account, or can last over a period of time, such as access to a bank account, email, or any other service.

A normal transaction starts with a user requesting a service using application device 10. Application device 10 sends a request to communication server 14. The user is notified to authenticate the transaction using mobile authentication device 12. Once the user activates the authentication application on mobile authentication device 12, it obtains the request from communication server 14, authenticates the user using adaptive authentication, and supplies the digital keys for the transaction. Application device 10 obtains the digital keys for the transaction, and uses them to request authorization from application server 16. Once authorized, application server 16 provides services to the user over application device 10. Also, if mobile authentication device 12 detects user motion is above a predetermined threshold or user separating from application device 10, the mobile authentication device 12 stops posting updates to communication server 14 and application device 10 can lock the user session. Authentication device 12 uses an onboard accelerometer, tilt sensor or Bluetooth/Bluetooth LE transceiver.

The user account on communication server 14 is paired with at least one smart phone unique identifier. The user cannot log in to the account without a paired smart phone. Pairing is a way of associating or linking a smart phone application to a user account. During registration, a unique identifier for the smart phone is stored in the user account on the remote server. During subsequent logins, the application onboard the smart phone obtains the unique identifier of the smart phone, and uses it to authenticate to the user account on the remote server.

Figure 2:
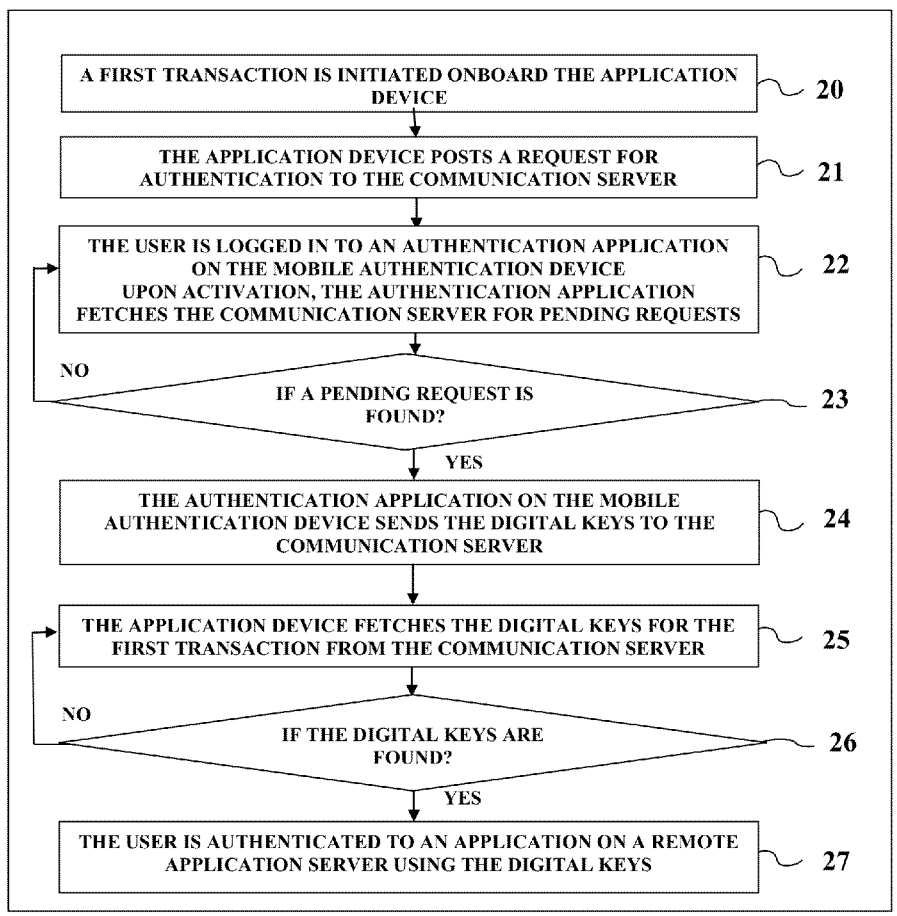
FIG. 2 is a flowchart illustrating a method for facilitating authentication using a mobile device.

Referring to FIG. 2, a flowchart illustrates a method for facilitating authentication using a smart phone. In step 20, a first transaction is initiated onboard application device 10.

For example, a user requests login to a bank account through a web browser, or a user requesting to purchase something from an application, or a user requests to purchase something on a TV set, or a user requesting to purchase something on a Point of Sale terminal, etc.

The user can provide a user identifier such as a user name or a phone number.

Alternatively, application device 10 can scan a user's device id wirelessly using Bluetooth, scan a bar code, obtain an identifier from memory, or obtain an identifier from a database.

Alternatively, the user identifier can be determined automatically through profiling such as a TV set determining who is in the room based on computer vision or other information.

The user can determine the transaction, or the transaction can be determined automatically from the current context. For example, if the user is watching a show, and there is a button or icon to purchase an item, the user can click on that button, and the transaction request will be automatically filled. The user may enter a quantity.

The button or icon can also be part of an application onboard the merchant terminal 10. When the application detects that the user moved, the application can lock access to the button or icon.

To detect the user has moved, the application can establish a Bluetooth/Bluetooth LE link with the mobile authentication device 12, and if the Bluetooth signal strength falls below a predetermined threshold, the application locks . . . .

Alternatively, the application can post verification transactions to communication server 14. If the user authentication application does not respond, the application locks . . . . Also, if the user authentication application detects motion, it stops updating the verification requests on the communication server 14, and that causes the application to lock or cloak, cancel transaction . . . .

Alternatively, the user can say that he/she saw an item for sale somewhere (billboard, TV channel, website . . . ) and a broker system can offer a selection of offers that the user can choose from. The user may enter a quantity.

In step 21, application device 10 posts a request for authentication to communication server 14 corresponding to a user account. The request for authentication can have the transaction details. Application device 10 can also post the required authentication method for the request based on policies corresponding to the transaction risk, location risk, user risk, device risk, time risk . . . , i.e. simple action verification, pass code verification or biometric verification based on context, such as in a trusted location/outside a trusted location/outside a country, or moving/still, or transaction profile or user profile . . . . This enables adaptive authentication or stepped up authentication whereby authentication is eased when the user/location/transaction risk is lower, and the authentication is hardened automatically when the user/location/transaction risk is higher.

The request for authentication can comprises a first transaction information such as the user name, the application name, the door name, door GPS, authentication type, the transaction name, the merchant name, the transaction amount, quantity, document name, or any other information, The transaction information may be presented to the user onboard authentication device 12 to solicit authentication.

Moreover, application device 10 can obtain policy information from a remote server policy database. The policy information indicate conditions for authorization such as:

Trusted locations defined by areas around a GPS coordinate or a WIFI network or an area near a known RF transmitter Security rules per trusted location, un-trusted location or area with no network connectivity (no WIFI, no 3 G network, no data network) including: Authentication Type: PIN, No PIN, text challenge authentication, voice challenge authentication, timeout duration (when no user activity), and application self-defense (lock, cloak, alarm, call a phone number, send SMS/Email, wipe application data)

In step 22, the user is logged in to an authentication application onboard a smart phone mobile authentication device 12. The authentication application authenticates the user using the user account onboard communication server 14.

In a preferred embodiment, the authentication application requests user authentication on install or the first time is it run, and after that, it will not request the user to authenticate. In an another preferred embodiment, the user application requests the user to authenticate every predetermined period of time, where the predetermined period of time is updated using a web-enabled policy dashboard.

Authentication device 12 obtains sensor information from sensors located onboard the device, such as current location (from a GPS receiver), acceleration (from an accelerometer), gyration, tilt, Wifi networks in view, radio frequency networks in view, radio frequency signal strength, lighting level, audio level, temperature.

The authentication device 12 can post the sensor information to communication server 14. If the sensor information does not match the policy parameters, the authentication device 12 or application terminal 10 can: abort operation, block response, lock, exist, cloak, cancel the current transaction, encrypt data;

Upon detection of a user event or activation, the authentication application can fetches the communication server 14 for pending requests for the user. It can determine the current location of the mobile authentication device 12 and send it to communication server 14. If the distance between mobile authentication device 12 and application device 10 is below a predetermined threshold, then the pending request is processed. The location of the merchant device is generally static and known, or can be determined live using a GPS receiver, WIFI networks or radio frequency beacons such as Bluetooth beacons. The location of mobile authentication device 12 is determined live using a GPS receiver, WIFI or a location determination system onboard mobile authentication device 12.

In step 23, if a pending request is found, the authentication application on mobile authentication device 12 displays the transaction details such as merchant name, item name, cost, account etc.

Authentication device 12 authenticates the user using adaptive authentication, and if the user is authenticated, it sends the user digital keys corresponding to the first transaction to communication server 14 in step 24. In step 25, application device 10 fetches for the digital keys for the first transaction from communication server 14. In step 26, if the digital keys are found, the user is authenticated to an application on application server 16 using the digital keys. In a preferred embodiment, application device 10 uses the digital keys to decrypt the user information (such as username and password . . . ) and uses the decrypted information to login or authenticate to an application on remote application server 16 in step 27.

Authenticate device 12 can display confirmation information including transaction details, confirmation number, account . . . . If application device 10 does not find any updates or requests onboard communication server 14, the transaction is not authorized.

In a preferred embodiment, Application device 10 sends a confirmation message to authentication device 12.

In another preferred embodiment, Application device 10 transmits the user's physical access code to an RF ID reader using RF emulation/simulation techniques, generally through an RF ID emulator/simulator.

The application can be a server application, a cloud-based application, an intranet application, a payment application, a network access system, a door access system.

The application has a fourth account corresponding to the first user account. Application device 10 periodically posts a verification request to communication server 14, and verifies that a response is posted to that verification request. If application device 10 does not obtain an update corresponding to the verification request, it performs the following action or actions: lock access to the fourth application, cloak the interface to the fourth application, cancel the first transaction.

Figure 3:
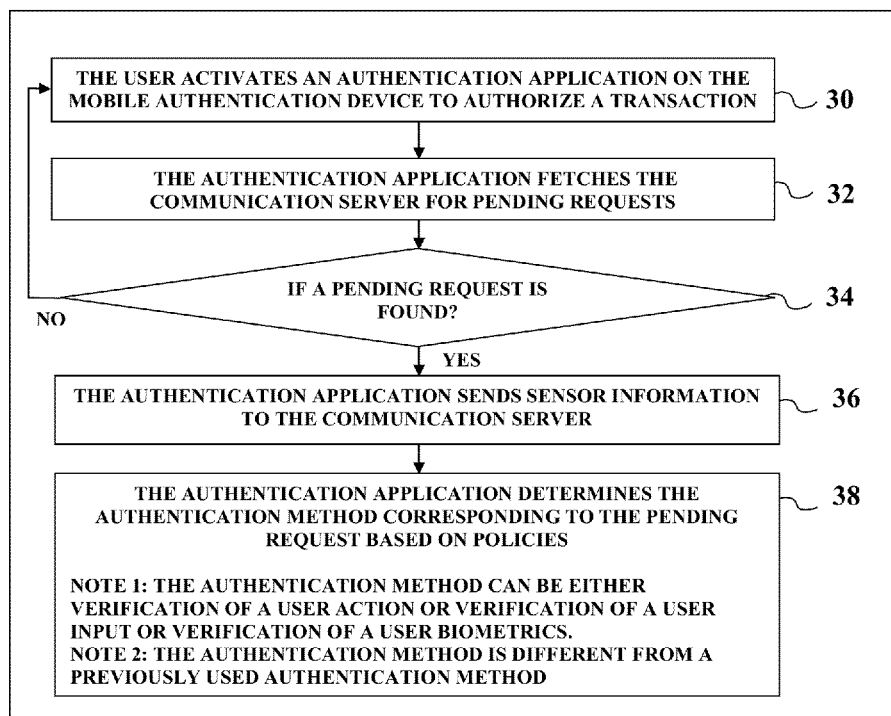
FIG. 3 is a flowchart illustrating adaptive authentication.

Referring to FIG. 3, the flowchart illustrates a method for adaptive authentication. In step 30, a user activates an authentication application on a smart phone mobile authentication device 12 to authorize a transaction that was previously initiated on application device 10. The authentication application fetches communication server 14 for pending requests in step 32, and if step 34, if a pending request is found, the authentication application can capture sensor information such as current GPS location, current motion (acceleration, gyro, tilt), current visible RF networks and their strength (Wifi, Bluetooth, cellular), current lighting level, current audio level, current temperature . . . . The authentication application can send this information to communication server 14.

the authentication application determines the authentication method corresponding to the pending request based on policies in step 36.

Several options can apply:
1—The policies are stored in the authentication application. The authentication application obtains the sensor information, and executes the policy that corresponds to that sensor information to determine the user authentication method:
 verify that the application can be accessed from the current location
 verify that the application can be accessed from the RF signal landscape
 verify that the application can be accessed with the current motion pattern
 verify that the application can be accessed with the current temperature level, sound level, lighting level . . .
 verify a button is activated or a menu is selected or a display is touched or an application is brought to the foreground,
 verify a pass code or a motion or a signature or a spoken phrase,
 verify biometric information,
2—The policies are stored in communication server 14 or can be passed by the application that initiated the operation, which is application device 10. Communication sever 14 can obtain the sensor information from mobile authentication device 12, and determine the authentication method that will be executed. Communication server 14 sends a code to authentication device 12 indicating the authentication method that will be executed.
3—A set of first level policies are stored in communication server 14 and executed on communication server 14 in order to generate a set of conditional directives for authentication device 12. Authentication device 12 obtains sensor information, and executes the conditional directives and possibly some locally stored policies The policies can be driven by:
1) Location risk: the user current location, i.e. in a country or in a state . . . or the user relative distance from a known location or a known fixture, i.e. distance from merchant terminal 10, distance from home location, or if the user device is on a known WIFI network or not, or if the user device is near a known RF beacon,
2) Transaction risk: The policies can be driven by a transaction profile, i.e. total purchase is above a threshold amount. The policies can be driven by a transaction history or a transaction pattern, i.e. user has made purchases that he/she was not used to make. They can also be driven by a device profile.
3) User risk: The policies can be driven by a user profile, i.e. credit history.

The authentication method can be
1) Verification of a user action such as a button or icon push, a display touch, a motion, a spoken word, an application brought to the foreground
2) Verification of a user input such as verify a pass code or a motion or a signature or a spoken phrase or a response to a challenge question in the form of typing/data entry, e.g. "What is your pet's name">> The user must answer with "Bobo" to pass the test.
3) Verification of biometric information such as finger prints, a hand signature, a response to a challenge question in the form of hand writing, a voice sample, a response to a challenge question in the form of voice response, fingerprint/iris/facial authentication
 If is noted that the challenge question is different from a previously displayed or issued challenge question
 It is noted that when obtaining a biometric response to a first challenge question, the biometric response is authenticated using a reference answer set corresponding to the first challenge question, Authentication application can use any one of the authentication method automatically depending on the policies. Also, if the parameters for a transaction n are different from those of a transaction n−1, the authentication method used for a transaction n is different from the authentication method used for transaction n+1.

For example, if the current geo-location of mobile authentication device 12 or application device 10 is within a pre-determined distance from a pre-defined location or if the transaction amount is below a threshold or if the application does not have sensitive data, the authentication application does not request a pass code;

The predefined location can be set by configuring GPS of office locations. The employee home address can be derived from his/her address, or can be set by the user clicking on a menu when they are at the trusted location.

if the current location is not within a pre-determined distance from a known location or if the transaction amount is above a threshold or if the application has some sensitive data, the authentication application requests a pass code;

if the current location is outside a pre-determined geo-fence (i.e. zone) or if the transaction matches a pre-determined profile or if the transaction amount is above a threshold or the application has highly sensitive data, the third authentication application requests biometric information. Also, if the transaction matches a risk profile using a fraud detection system . . . then the user may be subject to different authentication procedure such as text challenge (where user is requested to respond to a random question that he knows) or voice biometrics.

Mobile authentication device 12 can generate onetime passwords automatically and send them to communication server 14.

Authentication device 12 can get a token for communication server 14, sign it using PKI, and post it to communication sever 14.

Mobile authentication device 12 uses a microphone for capturing a sample user voice during initiation and configuration phase. The sample of user voice can be compared to an existing sample of the original user's voice. If correlation factor is above a threshold, the user is authenticated.

The biometric sensor can be an accelerometer for capturing accelerations corresponding to user hand signature and authenticating the user signature against stored user signatures.

The biometric identification signature can be a sample or a pre-processed sample of the user's signature, voice, finger print, iris scan or distinguishing biometric identification.

The identification signature can also include variations that correspond to different user conditions, tones, states, moods, etc.

Upon receipt of an event or a message to authenticate the user or upon detection of an event—such as wrong PIN code, change of driver, reset, detection of unknown conditions, a predetermined period of time elapses, the user may be requested to provide biometric information.

Mobile authentication device 12 may include an onboard accelerometer, motion sensor or tilt detector.

Mobile authentication device 12 may include a crypto chipset for hashing, encryption, AES256, SHA256, Apple Authentication chipset, a secure memory location or a Secure Element for storing the user password, username and password, random key, one-time-password generated using a one-time-password generator, certificate, Private Key Infrastructure key, symmetric key, asymmetric key, private key, public key, signed key, encryption key, decryption key, payment information.

Figure 4:
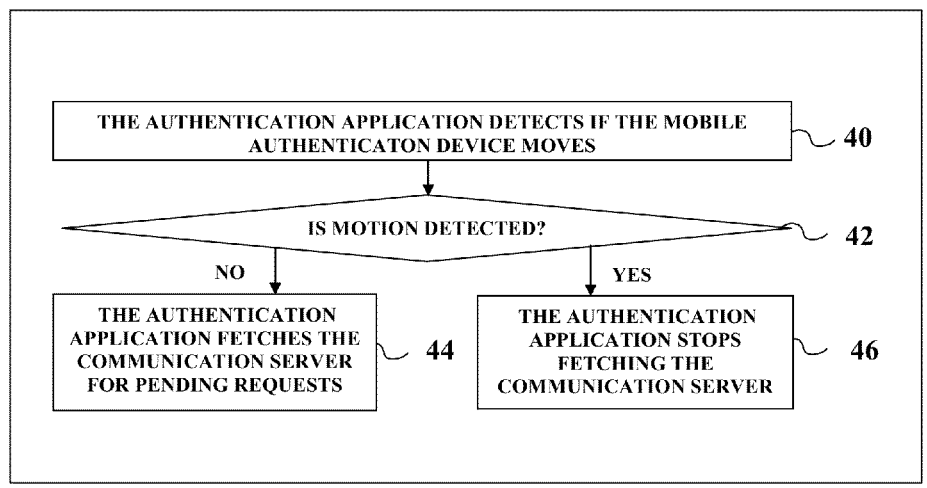
FIG. 4 is a flowchart illustrating a method for monitoring a user

Referring to FIG. 4, the flowchart illustrates a method for monitoring a user. In step 40, the authentication application detects if the user device moves. In step 42, if motion is detected, i.e. If the authentication device 12 detects motion or acceleration signals that are above a pre-determined threshold, the authentication application stops fetching the communication server in step 46. If motion is not detected, the authentication application fetches communication server 14 for pending requests. When the authentication application stops fetching and updating the communication server 46, the application onboard the application device 10 does not get the authentication information and locks, cloaks, closes, encrypt data.

Figure 5:
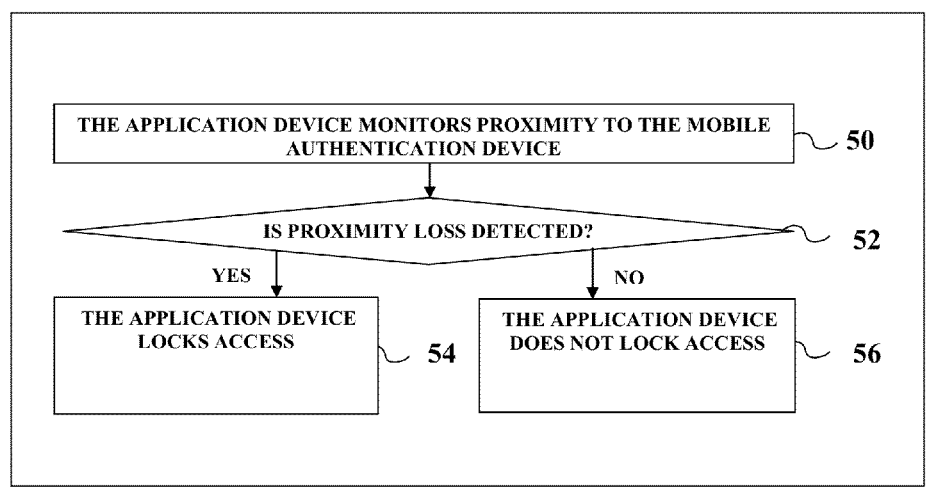
FIG. 5 is a flowchart illustrating another alternative for monitoring user proximity

Referring to FIG. 5, the flowchart illustrates another alternative for monitoring user proximity. In step 50, application device 10 monitors Bluetooth proximity to mobile authentication device 12. In step 52, if the Bluetooth signal falls below a threshold, application device 10 locks access to an application or cloaks the screen in step 54. . . . In step 56, application device 10 does not lock access.

Figure 6:
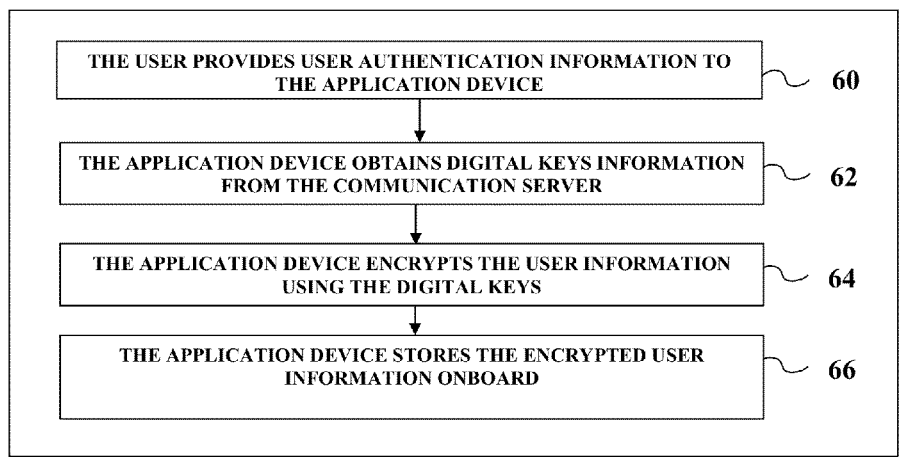
FIG. 6 is a flowchart illustrating a method for configuring auto-login

Referring to FIG. 6, the flowchart illustrates a method for configuring auto-login. The invention involves a one-time configuration phase whereby the user provides authentication information such as username/password onboard application device 10.

The authentication information enables authorization to target service. The authentication information is encrypted using digital keys obtained from mobile authentication device 12 through communication server 14. The authentication information is stored onboard application device 10. The encrypted authentication information can comprise: a password, a username and password, a random key, a one-time-password generated using a one-time-password generator, a certificate, a Private Key Infrastructure key, a symmetric key, an asymmetric key, a private key, a public key, a signed key, an encryption key, a decryption key, payment information. In step 60, application device 10 obtains information from the user that enables authentication or login to the application server 16. In step 62, application device 10 obtains digital keys information from communication server 14. The digital keys are provided using mobile authentication device 12. In step 64, application device 10 encrypts the user information using the digital keys and other information (such as user PIN, device ID, username, password . . . ). In step 66, application device 10 stores the encrypted user information onboard.

Figure 7:
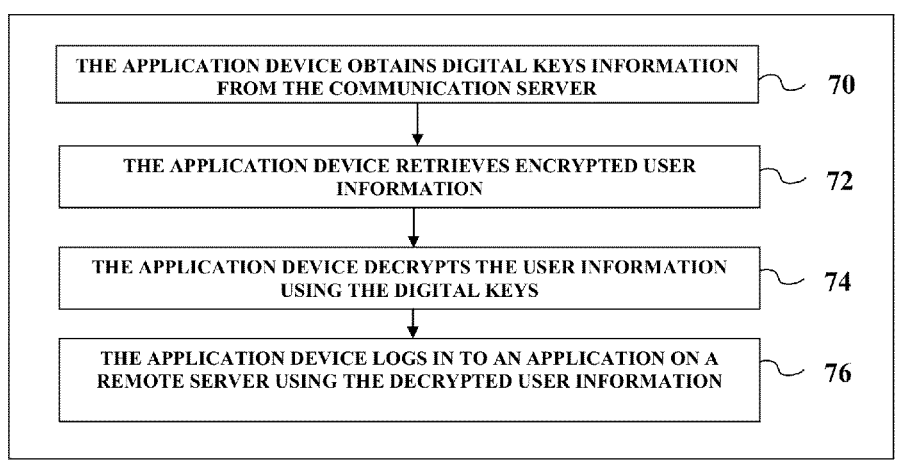
FIG. 7 is a flowchart illustrating a method for auto-login

Referring to FIG. 7, the flowchart illustrates a method for auto-login.

The invention enables no-password login, so that after a first user authentication, the user passwords will be decrypted and typed to corresponding applications using auto-fill—the passwords are encrypted and distributed over several devices, and are never stored on the cloud or in a single database. Also, when the user moves or separates from the device, the user applications cloak and the auto-fill stops.

In step 70, application device 10 obtains digital keys information from communication server 14. The digital keys are provided using mobile authentication device 12.

In step 72, application device 10 retrieves encrypted user information from memory. In step 74, application device 10 decrypts the user information using the obtained digital keys as well as other information such as the user PIN, the device ID, the username, password, account information . . . . In step 76, application device 10 sends a request for authentication, authorization or login to an application onboard a remote application server 16 comprising the decrypted user information.

In a preferred embodiment, a wrapper engine takes the user application for application device 10 and generates a wrapped version. The wrapper engine inserts object code into executables such as IPA for iOS and APK for Android. For web pages, the wrapper engine insert some code in the HTML or PHP file.

The wrapped versions enable to communication with communication server 14 for posting and retrieving updated transactions. It enables to provide password auto-fill, and can enable to lock or cloak the application if the user moves or is separated from his/her terminal.

Figure 8:
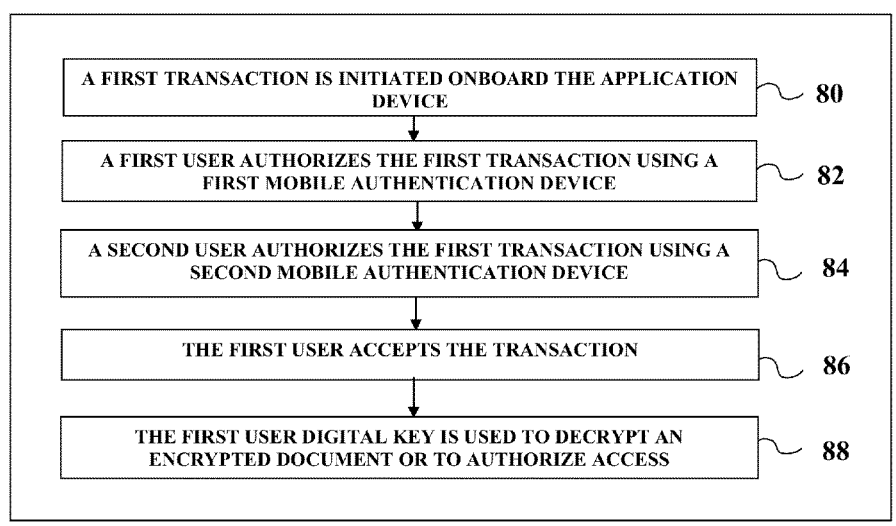
FIG. 8 is a flowchart illustrating a method for two-man rule

Referring to FIG. 8, a flowchart illustrates a method for two-man rule. In step 80, a first transaction is initiated onboard application device 10.

In step 82, a first user authentication the first transaction using a first mobile authentication device 12. In step 84, a second user authentication the first transaction using a second mobile authentication device 12. In step 86, the first user accepts the first transaction using the first mobile authentication device 12 and in step 88, the first user digital key is used to decrypt encrypted data, or to authorize access, or to login to a third system. In an alternative embodiment, the user digital key is used to unlock a lock, to uncloack an application, to authenticate to a remote server, to authorize a transaction, to transmit user information wirelessly to a second terminal (such as to emulate an RF ID card, and send the RF ID card information wirelessly to an RF ID door reader) or to call a script or API.

Figure 9:
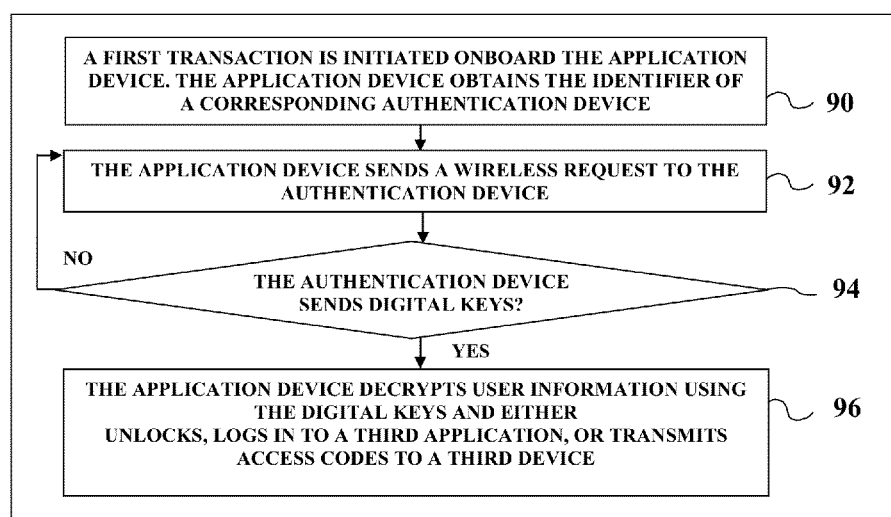
FIG. 9 is a flowchart illustrating an alternative method for adaptive facilitating authentication using a mobile device.

Referring to FIG. 9, a flowchart illustrates a method for facilitating authentication using a smart phone. In step 90, a first transaction is initiated onboard application device 10. Application device 10 obtains the identifier of a corresponding authentication device 12 from memory or from a database. In step 92, Application device 10 connects to authentication device 12 and sends a wireless request for authentication to the authentication device 12. Authentication device 12 runs an authentication application and stores digital keys (a password, a random key, a one-time-password generator, a certificate, a Private Key Infrastructure (PKI) key, a symmetric key, an asymmetric key, payment information, access information, physical access code) in secure memory such as key chain or secure element. In step 94, if the authentication device 12 returns digital keys, in step 96, the application device 10 decrypts previously stored user information using the digital keys and:

1—Unlock a locked application
2—Uncloak a cloaked application
3—Log in to a third application using the decrypted user information
4—Transmit access codes to a third device using an RF ID emulator
5—Decrypt access codes and transmits them to a third device using an RF ID emulator
6—Decrypt payment information and use them to execute a payment transaction
7—Decrypt a document or a data stream If an application is unlocked or uncloaked, the application device 10 monitors proximity to authentication device 12 and if the proximity falls below a threshold, locks or cloaks again. If in step 94, the authentication device 12 does not return digital keys, application device 10 does not unlock, uncloak, login . . . .

If step 94, the authentication device 12 can authenticate the user using a method such as:
  verify a button is activated or a menu is selected or a display is touched or an application is brought to the foreground,
  authenticate a pass code,
  authenticate a response to a challenge question,
  authenticate biometric information,
  verify that both the third mobile device and a fifth mobile device authorized the first transaction, wherein the fifth mobile device is distinct from the third mobile device
  The authentication method used on time is different from the authentication method used at another time. That is because authentication methods and timeouts change depending on location (trusted, un-trusted, no network), transaction risk ($ amount . . . ) user risk (transaction history . . . )

In another preferred embodiment, Application device 10 scans devices wirelessly, and checks the found devices against a list of authorized devices, if more than one know devices are found, the first application terminal displays a list of labels corresponding to the found devices, Upon a user selecting a label, the first application terminal requests a pass code corresponding to the selected label, and identifies the user.

In a preferred embodiment, application device 10 sends an authentication code to authentication device 12, the authentication code correspond to actions that will be carried by authentication device 12 including: verify a button is activated or a menu is selected or a display is touched or an application is brought to the foreground, authenticate a pass code, authenticate a response to a challenge question using a sample set stored onboard authentication device 12, authenticate biometric information using a sample set stored onboard authentication device 12.

The code for adaptive authentication can be compiled into a security layer object code and injected into the object code of another application. This enables fast implementation without coding or development, as well as consistent implementation. The features of adaptive authentication can be controlled through a policy console. The security layer can load the policies from the policy database.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A method for adaptive authentication comprising:
  initiating a transaction onboard a first terminal,
    whereby the first terminal obtains a user identifier using a method selected from the group consisting of:
      wireless scan of a user's device,
      scan a bar code,
      obtain an identifier from a user,
      obtain an identifier from memory,
      obtain an identifier from a database, and
      user profiling,
    wherein the first terminal posts an authentication request to a remote server,
      wherein the authentication request corresponds to a user identifier,
      wherein the authentication request comprises at least one transaction information item,
      wherein the first terminal can obtain policy information from a remote server,
      wherein the first terminal is selected from the group consisting of:
        a mobile device, a computing device, a television set, a point of sale terminal, and a physical access terminal;
  running an authentication program onboard a first mobile device,
    wherein the authentication program corresponds to the user identifier,
    wherein the authentication program can login to the remote server,
    wherein the authentication program stores at least one first digital key selected from the group consisting of:

a password, a random key, a one-time-password generator, a certificate, a Private Key Infrastructure (PKI) key, a symmetric key, an asymmetric key, payment information, access information, and physical access code, wherein the at least one first digital key can be stored in a secure memory location or on a secure element onboard the first mobile device, wherein the first mobile device is distinct from the first terminal, wherein upon detecting a user action onboard the first mobile device, wherein the user action is selected from the group consisting of:

a button push, a display touch, a motion, a spoken word, and an application brought to the foreground, if the authentication program obtains a pending authentication request wirelessly from the remote server, wherein the pending authentication request corresponds to the user identifier, the authentication program can display the at least one transaction information, the authentication program initiates a user authentication action onboard the first mobile device and uses a user authentication method selected from the group consisting of:

verify a button is activated or a menu is selected or a display is touched or an application is brought to the foreground, authenticate a pass code, authenticate a response to a challenge question, and authenticate biometric information, wherein the user authentication method is different from a previously used user authentication method, wherein upon or after a successful user authentication, the authentication program posts an authentication information update to the remote server, wherein the authentication information update corresponds to the pending authentication request, wherein the authentication information update comprises the at least one first digital key or at least one second digital key corresponding to the at least one first digital key;

whereby after a pre-determined period of time, if the first terminal retrieves an authentication information update corresponding to the authentication request, the first terminal uses the authentication information update to perform an action selected from the group consisting of:

unlock, uncloak, decrypt data, login to an application, authenticate to a remote server, authorize a second transaction, transmit user information wirelessly to a separate terminal, login automatically to an application interface, and call a script.

2. The method of claim 1 whereby:

the first terminal posts confirmation information corresponding to the transaction to the remote server, the authentication program retrieves the confirmation information, the authentication program displays the confirmation information.

3. The method of claim 1 whereby:

if the distance between the current location of the first mobile device and the current location of the first terminal is above a threshold, the transaction is not authorized;

the first terminal can periodically post verification requests to the remote server, wherein if the first terminal does not obtain an update corresponding to a verification request, the first terminal can perform an action selected from the group consisting of: lock, cloak, cancel, reject, and encrypt data.

4. The method of claim 1 comprising:

if the first mobile device detects motion or acceleration signals that are above a pre-determined threshold, an application onboard the first terminal performs an action selected from the group consisting of: lock, cloak, close, and encrypt data;

wherein the motion signals are captured using an accelerometer or a tilt detector onboard the first mobile device.

5. The method of claim 1 whereby:

the authentication program obtains sensor information from sensors located onboard the first mobile device, wherein the sensor information is selected from the group consisting of:

current location information, acceleration information, gyration information, tilt information, WIFI networks in view information, radio frequency networks in view information, radio frequency signal strength information, lighting level information, audio level information, and temperature information, wherein the authentication program can post the sensor information to the remote server, wherein if the sensor information does not match at least one pre-determined policy, the authentication program can perform an action selected from the group consisting of:

abort operation, block response, lock, exist, cloak, cancel the current transaction, and encrypt data;

whereby if the location of the first terminal is within a pre-determined distance from a predetermined location or if the first terminal is connected to a trusted WIFI network or if the current transaction amount is below a pre-determined threshold, the user authentication method can be selected from the group consisting of:

verify a button is activated, verify a menu is selected, verify a display is touched, and verify GP an application is brought to the foreground;

whereby if the location of the first terminal is outside pre-determined areas or if the first terminal is outside a pre-determined WIFI coverage areas or if the current transaction amount is above a pre-determined threshold, the user authentication method can be selected from the group consisting of:

authenticate a pass code, and authenticate a response to a challenge question;

whereby if the first terminal is not connected to any 3 G or WIFI network or if the transaction matches a pre-determined condition, the user authentication method can be selected from the group consisting of:

authenticate biometric information, and verify that both the first mobile device and a second mobile device authorized the transaction, wherein the second mobile device is distinct from the first mobile device.

6. The method of claim 1 comprising:
if the current location is within a pre-determined distance from a pre-defined location or if a pre-determined WIFI network is detected,
the authentication program does not request a pass code;
if the current location is not within a pre-determined distance from a known location,
the authentication program requests a pass code;
if the first terminal is not connected to any data network or if the current location is outside a pre-determined area or if the current transaction matches a pre-determined risk profile,
the authentication program can request biometric information;
whereby after a user is logged in to an application,
if the current location is within a pre-determined distance from a pre-defined location or if a pre-determined WIFI network is detected,
the application locks after a first pre-determined period of inactivity;
if the current location is not within a pre-determined distance from a known location,
the application locks after a second pre-determined period of inactivity,
wherein the second pre-determined period of inactivity can be different from the first pre-determined period of inactivity.

7. The method of claim 1 comprising:
obtaining authentication policies corresponding to information selected from the group consisting of:
the current location information of the first mobile device, the current location information of the first terminal, connected WIFI, sensed radiofrequency signals, a transaction information, the current time of day, a user profile, an application profile, a transaction profile, and a device profile;
if the authentication policies indicate pass code verification,
the authentication program requests a pass code,
if the authentication policies indicate biometric verification,
the authentication program requests biometric information.

8. The method of claim 1 comprising:
the first terminal posting an authentication code to the remote server,
wherein if the authentication code indicates user action verification,
the authentication program verifies a button is activated or a menu is selected or a display is touched or an application is brought to the foreground,
if the authentication code indicates pass code verification,
the authentication program requests a pass code,
if the authentication code indicates biometric verification,
the authentication program can request biometric information.

9. The method of claim 1 comprising:
the first terminal obtaining a digital key from the authentication information update,
the first terminal decrypting user information using the digital key,
the first terminal using the decrypted user information to perform an action selected from the group consisting of: login to a user account, fill a form, execute a payment transaction, unlock, and decrypt data.

10. The method of claim 1 whereby:
the user authentication method comprises verification of biometric information,
wherein the biometric information is selected from the group consisting of:
voice authentication, voice authentication challenge, handwriting authentication challenge, fingerprint authentication, iris authentication, and facial authentication.

11. The method of claim 1 comprising:
displaying a first challenge question,
wherein the first challenge question is different from a previously displayed challenge question;
obtaining a response to the first challenge question selected from the group consisting of:
voice response, text response, and gesture response;
whereby the response is authenticated using a reference answer set corresponding to the first challenge question,
wherein the reference answer set is stored onboard the first terminal or the first mobile device,
wherein if a match is found,
the transaction is authorized.

12. A method for adaptive authentication comprising:
initiating a transaction onboard a first terminal,
whereby the first terminal posts an authentication request to a remote server,
wherein the authentication request corresponds to a user identifier;
running an authentication program onboard a first mobile device,
wherein the authentication program corresponds to the user identifier,
wherein the authentication program stores at least one first digital key onboard the first mobile device,
wherein upon detecting a user action onboard the first mobile device,
if the authentication program obtains a pending authentication request wirelessly from the remote server,
wherein the pending authentication request corresponds to the user identifier,
the authentication program can display the transaction information,
the authentication program initiates a user authentication action onboard the first mobile device and uses a user authentication method selected from the group consisting of:
verify a button is activated or a menu is selected or a display is touched or an application is brought to the foreground,
authenticate a pass code,
authenticate a response to a challenge question,
authenticate biometric information, and
verify that both the first mobile device and a second mobile device authorized the first transaction,
wherein the second mobile device is distinct from the first mobile device,
wherein the user authentication method is different from a previously used user authentication method,
wherein upon or after a successful user authentication,
the authentication program posts an authentication information update to the remote server, wherein the authentication information update corresponds to the pending authentication request,
wherein the authentication information update comprises the at least one first digital key or at least one second digital key corresponding to the at least one first digital key;
whereby after a pre-determined period of time,
if the first terminal retrieves an authentication information update corresponding to the authentication request,
the first terminal uses the authentication information update to perform an action selected from the group consisting of:
unlock, uncloak, decrypt data, login to an application, authenticate to a remote server, authorize a second transaction, transmit user information wirelessly to a separate terminal, login automatically to an application interface, and call a script.

13. A method for adaptive authentication comprising:
initiating a first transaction onboard a first terminal,
whereby the first terminal can obtain a token identifier either from memory, from a remote database, or by scanning devices using short wireless communication,
whereby the first terminal can obtain policy information from a remote server,
whereby the first terminal sends a authentication request wirelessly to a first mobile device,
wherein the authentication request can comprise the transaction information,
wherein the first mobile device corresponds to the token identifier;
running an authentication program onboard a first mobile device,
wherein the authentication program stores at least one first digital key selected from the group consisting of:
a password, a random key, a one-time-password generator, a certificate, a Private Key Infrastructure (PKI) key, a symmetric key, an asymmetric key, payment information, access information, and physical access code,
wherein the at least one first digital key can be stored in a secure memory location or on a secure element onboard the first mobile device,
wherein the first mobile device is distinct from the first terminal;
whereby after receipt of a wireless response from the mobile device,
wherein the wireless response comprises at least one second digital key corresponding to the at least one first digital key,
the first terminal initiates a user authentication action and uses a user authentication method selected from the group consisting of:
verify a button is activated or a menu is selected or a display is touched or an application is brought to the foreground,
authenticate a pass code,
authenticate a response to a challenge question,
authenticate biometric information, and
verify that both the first mobile device and a second mobile device authorized the transaction,
wherein the second mobile device is distinct from the first mobile device,
wherein the user authentication method is different from a previously used user authentication method;
wherein upon or after a successful user authentication,
the first terminal uses the at least one second digital key to perform an action selected from the group consisting of:
unlock, uncloak, decrypt data, login to an application, authenticate to a remote server, authorize a second transaction, transmit user information wirelessly to a separate terminal, login automatically to an application interface, and call a script.

14. The method of claim 13 comprising:
the transaction is initiated upon activation of a button or an icon,
wherein the button or icon is part of an application onboard the first terminal,
whereby a short wireless communication link is established between the first terminal and the first mobile device,
whereby if the signal of the short wireless communication link drops below a predetermined threshold,
the application performs an action selected from the group consisting of: lock, cloak, cancel the current transaction, and encrypt data.

15. The method of claim 13 comprising:
upon or after a successful user authentication,
the first terminal transmits user information wirelessly to a remote terminal using an RFID emulator or an RFID simulator.

16. The method of claim 13 whereby:
the first terminal scans devices wirelessly,
the first terminal checks the found devices against a list of authorized devices,
if more than one known devices are found,
the first terminal displays a list of labels corresponding to the found devices,
whereby upon selection of a label, the first terminal requests user authentication corresponding to the selected label.

17. The method of claim 13 comprising:
the first terminal sending an authentication code to the first mobile device,
wherein the authentication code corresponds to an authentication action selected from the group consisting of:
the authentication program verifies a button is activated or a menu is selected or a display is touched or an application is brought to the foreground,
the authentication program authenticates a pass code,
the authentication program authenticates a response to a challenge question using a sample set stored onboard the first mobile device,
the authentication program authenticates biometric information using a sample set stored onboard the first mobile device, and
the authentication program verifies that both the first mobile device and a second mobile device authorized the transaction,
wherein the second mobile device is distinct from the first mobile device.

18. The method of claim 13 wherein:
a user is logged in to an application, wherein
if the current location is within a pre-determined distance from a pre-defined location or if a pre-determined WIFI network is detected,
the application is timed out after a first pre-determined period of inactivity;
if the current location is not within a pre-determined distance from a known location, the application is timed out after a second pre-determined period of inactivity,
wherein the second pre-determined period of inactivity is different from the first pre-determined period of inactivity.

19. The method of claim 13 comprising:
the first terminal obtaining a digital key from the authentication program,
the first terminal decrypting encrypted user information using the digital key,
the first terminal using the decrypted user information to perform an action selected from the group consisting of: login to a user account, fill a form, execute a payment transaction, unlock, and decrypt data.

20. The methods of claim 1, 12, or 13 comprising:
injecting object code that provides adaptive authentication in an application executable.

* * * * *